US006696927B2

United States Patent
Flick

(10) Patent No.: US 6,696,927 B2
(45) Date of Patent: Feb. 24, 2004

(54) VEHICLE SECURITY SYSTEM FOR A VEHICLE HAVING A DATA COMMUNICATIONS BUS AND RELATED METHODS

(75) Inventor: Kenneth E. Flick, Douglasville, GA (US)

(73) Assignee: Omega Patents, L.L.C., Douglasville, GA (US)

(*) Notice: Subject to any disclaimer, the term of this patent is extended or adjusted under 35 U.S.C. 154(b) by 0 days.

(21) Appl. No.: 10/264,917

(22) Filed: Oct. 4, 2002

(65) Prior Publication Data

US 2003/0030549 A1 Feb. 13, 2003

Related U.S. Application Data

(63) Continuation-in-part of application No. 09/583,333, filed on May 31, 2000, which is a continuation-in-part of application No. 09/382,245, filed on Aug. 25, 1999, now Pat. No. 6,275,147, which is a continuation of application No. 09/023,838, filed on Feb. 13, 1998, now Pat. No. 6,011,460, which is a continuation-in-part of application No. 08/701,356, filed on Aug. 22, 1996, now Pat. No. 5,719,551.

(51) Int. Cl.[7] .............................................. B60R 25/10
(52) U.S. Cl. .............................. 340/426.1; 340/426.11; 340/426.13; 340/426.28; 307/10.2; 180/287
(58) Field of Search ........................ 340/426.1, 426.13, 340/425.5, 426.14, 428, 531, 533, 534, 539.1, 576, 825.69, 426.16, 426.17, 426.18, 426.28, 426.11, 426.3, 426.36; 307/10.2, 10.3, 10.4, 10.5, 10.6; 180/287

(56) References Cited

U.S. PATENT DOCUMENTS

| 4,055,772 A | 10/1977 | Leung ....................... 307/10 R |
| 4,236,594 A | 12/1980 | Ramsperger ................ 180/167 |
| 4,288,778 A | 9/1981 | Zucker ......................... 340/64 |

(List continued on next page.)

FOREIGN PATENT DOCUMENTS

| DE | 195 30 721 A1 | 2/1997 | ............ H02J/9/04 |
| EP | 0 699 562 A2 | 7/1995 | ........... B60R/16/02 |
| WO | WO97/28988 | 8/1997 | ........... B60R/16/02 |

OTHER PUBLICATIONS

Society of Automotive Engineers, Inc., "Surface Vehicle Information Report", SAE J2058 (Jun. 21, 1990).
Society of Automotive Engineers, Inc., "Surface Vehicle Standard", SAE J1850 (rev'd 7/95).
Mark Thompson, "The Thick and Thin of Car Cabling", IEEE Spectrum, pp. 42–45 (Feb. 1996).

Primary Examiner—Toan N Pham
(74) Attorney, Agent, or Firm—Allen, Dyer, Doppelt, Milbrath & Gilchrist, P.A.

(57) ABSTRACT

A vehicle security system includes a vehicle security sensor and associated sensor bus interface, an alarm indicator and associated alarm indicator bus interface, and an alarm controller and associated alarm controller bus interface for interfacing the alarm controller. The vehicle security system is for a vehicle of a type including a data communications bus connecting a plurality of vehicle devices. The security system preferably further includes a desired signal enabling circuit for enabling the alarm controller to operate using a set of desired signals for a desired vehicle from among a plurality of possible sets of signals for different vehicles.

19 Claims, 8 Drawing Sheets

U.S. PATENT DOCUMENTS

| | | | |
|---|---|---|---|
| 4,383,242 A | 5/1983 | Sassover et al. ............... 340/64 |
| 4,446,460 A | 5/1984 | Tholl et al. ............ 340/825.69 |
| 4,538,262 A | 8/1985 | Sinniger et al. .............. 370/85 |
| 4,697,092 A | 9/1987 | Roggendorf et al. ...... 307/10 R |
| 4,754,255 A | 6/1988 | Saunders et al. ............. 340/64 |
| 4,760,275 A | 7/1988 | Sato et al. ................. 307/10 R |
| 4,761,645 A | 8/1988 | Mochida ................ 340/825.31 |
| 4,792,783 A | 12/1988 | Burgess et al. ................ 340/22 |
| 4,841,159 A | 6/1989 | Evans et al. ................... 307/38 |
| 4,926,332 A | 5/1990 | Komuro et al. ........ 364/424.05 |
| 5,006,843 A | 4/1991 | Hauer ................... 340/825.31 |
| 5,024,186 A | 6/1991 | Long et al. ............. 123/179 B |
| 5,040,990 A | 8/1991 | Suman et al. ................. 439/34 |
| 5,046,041 A | 9/1991 | Lecocq et al. ............... 364/900 |
| 5,049,867 A | 9/1991 | Stouffer ....................... 340/426 |
| 5,054,569 A | 10/1991 | Scott et al. ................. 180/167 |
| 5,081,667 A | 1/1992 | Drori et al. .................... 379/59 |
| 5,142,278 A | 8/1992 | Moallemi et al. ...... 240/825.06 |
| 5,146,215 A | 9/1992 | Drori .................... 340/825.32 |
| 5,243,322 A | 9/1993 | Thompson et al. ......... 340/429 |
| 5,252,966 A | 10/1993 | Lambropoulos et al. ..................... 340/825.69 |
| 5,406,270 A | 4/1995 | Van Lente ............. 340/825.34 |
| 5,473,540 A | 12/1995 | Schmitz ........................ 701/1 |
| 5,475,818 A | 12/1995 | Molyneaux et al. ... 395/200.05 |
| 5,481,253 A | 1/1996 | Phelan et al. .......... 340/825.31 |
| 5,506,562 A | 4/1996 | Wiesner ................... 340/425.5 |
| 5,521,588 A | 5/1996 | Kuhner et al. |
| 5,523,948 A | 6/1996 | Adrain |
| 5,525,977 A * | 6/1996 | Suman ................... 340/825.25 |
| 5,555,498 A | 9/1996 | Berra et al. ............. 364/424.03 |
| 5,606,306 A | 2/1997 | Mutoh et al. ................ 640/426 |
| 5,612,578 A | 3/1997 | Drew ........................ 307/10.5 |
| 5,619,412 A | 4/1997 | Hapka ................. 364/424.045 |
| 5,646,457 A | 7/1997 | Vakavtchiev ............... 307/10.6 |
| 5,673,017 A | 9/1997 | Dery et al. .................. 340/426 |
| 5,689,142 A | 11/1997 | Liu ........................... 307/10.5 |
| 5,719,551 A | 2/1998 | Flick ........................... 340/426 |
| 5,721,550 A | 2/1998 | Lopez ........................ 341/176 |
| 5,751,073 A | 5/1998 | Ross ........................ 307/10.5 |
| 5,757,086 A | 5/1998 | Nagashima ................ 307/10.6 |
| 5,811,886 A | 9/1998 | Majmudar .................. 340/426 |
| 5,818,330 A | 10/1998 | Schweiger .................. 340/426 |
| 5,832,397 A | 11/1998 | Yoshida et al. ................ 701/29 |
| 5,838,255 A | 11/1998 | DiCroce ................. 340/825.69 |
| 5,864,297 A * | 1/1999 | Sollestre et al. ........... 340/5.23 |
| 5,912,512 A | 6/1999 | Hayashi et al. ............ 307/10.5 |
| 6,011,460 A | 1/2000 | Flick ........................... 340/426 |
| 6,275,147 B1 | 8/2001 | Flick ........................... 340/426 |

\* cited by examiner

VEHICLE SECURITY SYSTEM FOR A VEHICLE HAVING A DATA COMMUNICATIONS BUS AND RELATED METHODS

RELATED APPLICATIONS

The present application is a continuation-in-part of U.S. patent application Ser. No. 09/583,333 filed on May 31, 2000, which, in turn, is a continuation-in-part of U.S. patent application Ser. No. 09/382,245 filed on Aug. 25, 1999, now U.S. Pat. No. 6,275,147, which, in turn, is a continuation of U.S. patent application Ser. No. 09/023,838, now U.S. Pat. No. 6,011,460, filed on Feb. 13, 1998 which, in turn, is a continuation-in-part of U.S. patent application Ser. No. 08/701,356, now U.S. Pat. No. 5,719,551, filed on Aug. 22, 1996 the entire disclosures of which are incorporated herein by reference.

FIELD OF THE INVENTION

The present invention relates to the field of security systems and, more particularly, to a security system and related methods for vehicles.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function U.S. Pat. No. 5,252,966 to Lambropoulous et al. discloses a remote keyless entry system for a vehicle. The keyless entry system permits the user to remotely open the vehicle doors or open the vehicle trunk using a small handheld transmitter.

Unfortunately, the majority of vehicle security systems need to be directly connected by wires to individual vehicle devices, such as the vehicle horn or door switches of the vehicle. In other words, a conventional vehicle security system is hardwired to various vehicle components, typically by splicing into vehicle wiring harnesses or via interposing T-harnesses and connectors. The number of electrical devices in a vehicle has increased so that the size and complexity of wiring harnesses has also increased. For example, the steering wheel may include horn switches, an airbag, turn-signal and headlight switches, wiper controls, cruise control switches, ignition wiring, an emergency flasher switch, and/or radio controls. Likewise, a door of a vehicle, for example, may include window controls, locks, outside mirror switches, and/or door-panel light switches.

In response to the increased wiring complexity and costs, vehicle manufacturers have begun attempts to reduce the amount of wiring within vehicles to reduce weight, reduce wire routing problems, decrease costs, and reduce complications which may arise when troubleshooting the electrical system. For example, some manufacturers have adopted multiplexing schemes to reduce cables to three or four wires and to simplify the exchange of data among the various onboard electronic systems as disclosed, for example, in "The Thick and Thin of Car Cabling" by Thompson appearing in the IEEE Spectrum, February 1996, pp. 42–45.

Implementing multiplexing concepts in vehicles in a cost-effective and reliable manner may not be easy. Successful implementation, for example, may require the development of low or error-free communications in what can be harsh vehicle environments. With multiplexing technology, the various electronic modules or devices may be linked by a single signal wire in a bus also containing a power wire, and one or more ground wires. Digital messages are communicated to all modules over the data communications bus. Each message may have one or more addresses associated with it so that the devices can recognize which messages to ignore and which messages to respond to or read.

The Thompson article describes a number of multiplexed networks for vehicles. In particular, the Grand Cherokee made by Chrysler is described as having five multiplex nodes or controllers: the engine controller, the temperature controller, the airbag controller, the theft alarm, and the overhead console. Other nodes for different vehicles may include a transmission controller, a trip computer, an instrument cluster controller, an antilock braking controller, an active suspension controller, and a body controller for devices in the passenger compartment.

A number of patent references are also directed to digital or multiplex communications networks or circuits, such as may be used in a vehicle. For example, U.S. Pat. No. 4,538,262 Sinniger et al. discloses a multiplex bus system including a master control unit and a plurality of receiver-transmitter units connected thereto. Similarly, U.S. Pat. No. 4,055,772 to Leung discloses a power bus in a vehicle controlled by a low current digitally coded communications system. Other references disclosing various vehicle multiplex control systems include, for example, U.S. Pat. No. 4,760,275 to Sato et al.; U.S. Pat. No. 4,697,092 to Roggendorf et al.; and U.S. Pat. No. 4,792,783 to Burgess et al.

Several standards have been proposed for vehicle multiplex networks including, for example, the Society of Automotive Engineers "Surface Vehicle Standard, Class B Data Communications Network Interface", SAE J1850, July 1995. Another report by the SAE is the "Surface Vehicle Information Report, Chrysler Sensor and Control (CSC) Bus Multiplexing Network for Class 'A' Applications", SAE J2058, July 1990. Many other networks are also being implemented or proposed for communications between vehicle devices and nodes or controllers.

Unfortunately, conventional vehicle security systems for hardwired connection to vehicle devices, such as aftermarket vehicle security systems, are not readily adaptable to a vehicle including a data communications bus. Moreover, a vehicle security system if adapted for a communications bus and devices for one particular model, model year, and manufacturer, may not be compatible with any other models, model years, or manufacturers. Other systems for remote control of vehicle functions may also suffer from such shortcomings.

SUMMARY OF THE INVENTION

In view of the foregoing background, it is therefore an object of the present invention to provide a vehicle security system and associated method which is readily adapted or adaptable for installation in a vehicle having a data communications bus.

It is another object of the present invention to provide a security system or other remote control function systems and associated methods for installation in a vehicle having a data communications bus, and wherein the vehicle is one from among a plurality of different vehicles with different device addresses and/or signal protocols for communicating with the vehicle devices.

These and other objects, advantages and features of the present invention are provided by a vehicle security system for a vehicle of a type including a data communications bus connecting a plurality of vehicle devices. In particular, the vehicle security system preferably comprises a vehicle security sensor and associated sensor bus interface means for interfacing the vehicle security sensor to the data communications bus. The vehicle security system also preferably includes an alarm indicator and associated alarm indicator bus interface means for interfacing the alarm indicator to the data communications bus. An alarm controller and associated alarm controller bus interface means are also preferably included. The security system further preferably comprises desired signal enabling means for enabling the alarm controller to operate using a desired set of signals for a desired vehicle from among a plurality of possible sets of signals for different vehicles. Accordingly, the desired signal enabling means permits the alarm controller to communicate with the vehicle security sensor and the alarm indicator via the data communications bus so that the alarm controller is capable of operating the alarm indicator responsive to the vehicle security sensor. The security system is thus advantageously compatible with many different types of vehicle data communications formats or protocols.

The data communications bus may preferably be a multiplexed data bus. Accordingly, the sensor bus interface means, the alarm bus interface means, and the alarm controller bus interface means may each comprise multiplexing means for interfacing with the multiplexed data bus of the vehicle.

The desired signal enabling means may preferably include memory means for storing a plurality of sets of signals for different vehicles, and selecting means for selecting the desired set of signals from the plurality of different sets of signals. In one embodiment, the selecting means may comprise user selecting means for permitting a user to select the desired set of signals. In another embodiment, the selecting means may comprise determining means for determining the desired set of signals based upon signals on the data communications bus.

The memory means may include device address memory means for storing a plurality of different sets of signals representative of different device addresses for different vehicles. Alternatively, or in addition thereto, the memory means may comprise protocol memory means for storing a plurality of different protocols for different vehicles.

In yet another embodiment, the desired signal enabling means may comprise learning means for learning the desired set of signals. For example, the learning means may comprise downloading learning means for learning the desired set of signals from another device or central station. In particular, the security system may interface to a cellular telephone and the desired set of signals may be downloaded or received and stored via the cellular telephone. In another variation, the learning means may comprise bus learning means for learning the desired set of signals based upon signals on the data communications bus. The security system, according to another aspect of the invention, may also interface with an existing vehicle controller or a communications bus node which is operatively connected to the data communications bus.

A method aspect of the invention is for operating a vehicle security system for a vehicle of a type including a data communications bus connecting a plurality of vehicle devices. The method preferably comprises the steps of interfacing an alarm controller to the data communications bus, and enabling the alarm controller to operate using a desired set of digital signals for a desired vehicle from a plurality of sets of signals for different vehicles to thereby permit the alarm controller to communicate with at least one of a vehicle security sensor and an alarm indicator via the data communications bus. Accordingly, the alarm controller is capable of operating the alarm indicator responsive to the vehicle security sensor and via the data communication bus.

The concepts and features of the invention may also be desirably incorporated in a remote control system for a vehicle, such as a vehicle security system, a remote engine starter system, or a remote keyless entry system, for example. The remote control system preferably comprises a remote transmitter and a receiver within the vehicle for receiving a signal from the remote transmitter. A vehicle function controller is provided along with an associated vehicle function controller bus interface means for interfacing the vehicle function controller to the data communications bus. The remote control system also includes desired signal enabling means for causing the vehicle function controller to operate using a desired set of signals for a desired vehicle from a plurality of possible sets of digital signals for different vehicles. Accordingly, the vehicle function controller can communicate with a vehicle device via the data communications bus so that the vehicle function controller is capable of operating the vehicle device responsive to the remote transmitter. Method aspects of this embodiment of the invention are also disclosed.

DETAILED DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime and multiple prime notation are used in alternate embodiments to indicate similar elements.

Figure 1:
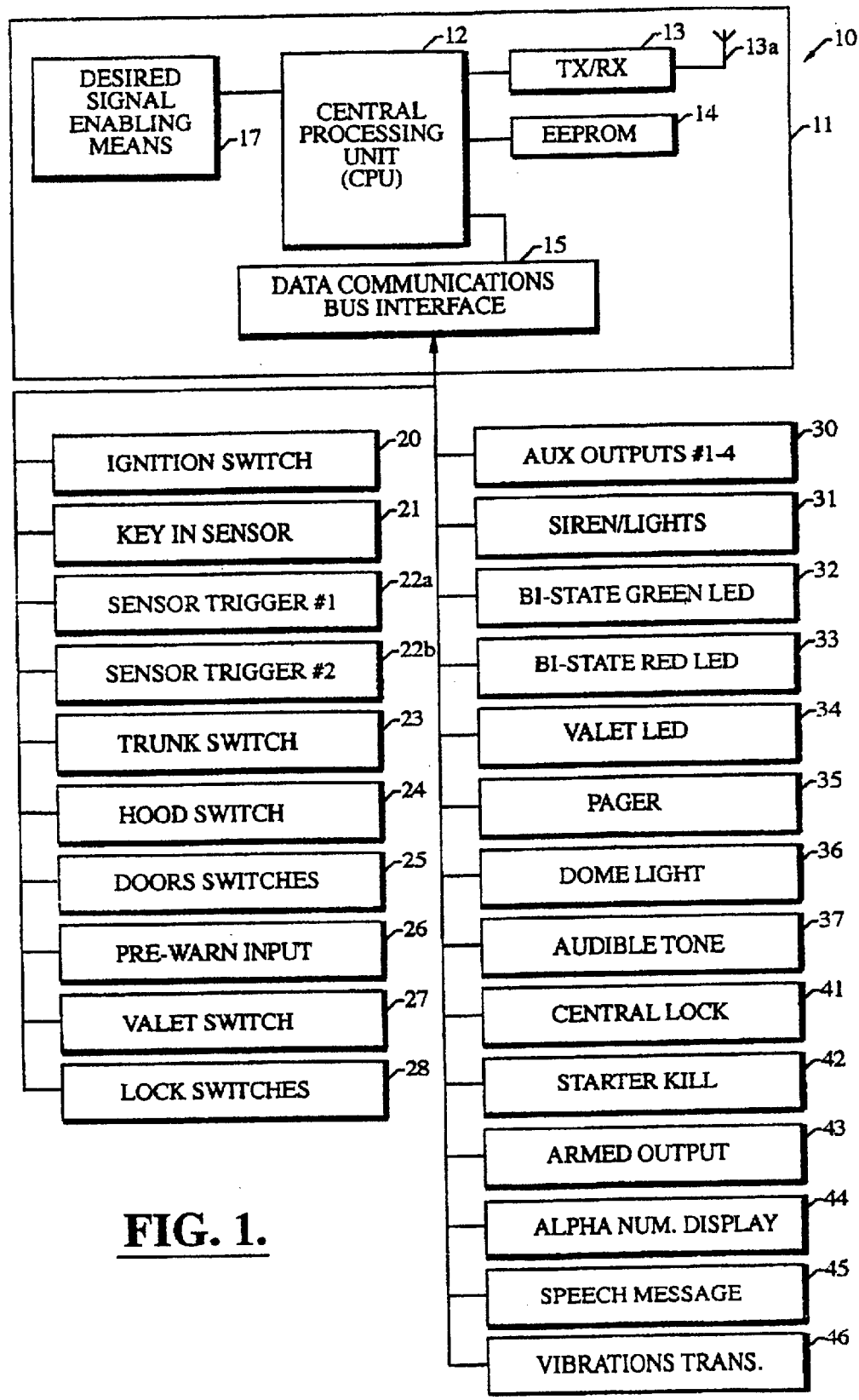
FIG. 1 is a schematic block diagram of the vehicle security system in accordance with the invention.

Referring now to the schematic block diagram of FIG. 1, a vehicle security system 10 according to one aspect of the invention is first described. The security system includes a controller 11 which, in turn, in the illustrated embodiment includes a central processing unit (CPU) or microprocessor 12 operating under stored program control.

In the illustrated embodiment, a transmitter and receiver 13 are connected to the CPU 12 for receiving signals from a remote transmitter and for transmitting signals to a remote unit, as will be described in greater detail below. As would be readily understood by those skilled in the art, the transmitter portion of the controller 11 may not be needed in some embodiments of the invention. An antenna 13a is illustratively connected to the transmitter and receiver 13.

In the illustrated embodiment, the CPU 12 is also operatively connected to a memory (EEPROM) 14 and a data communications bus interface 15 which provides both input and output interfaces to various vehicle devices. As would be readily understood by those skilled in the art, the CPU 12 may alternately or additionally have its own on-board memory.

The data communications bus interface 15 is illustratively connected to various vehicle input devices including: an ignition switch 20; a key in the ignition sensor 21; two zone sensors 22a, 22b; conventional trunk hood and door pin sensors or switches 23, 24, and 25, respectively; and door lock switches 28. In addition, a pre-warn sensor 26 and valet switch 27 also provide inputs to the controller 11 in the illustrated embodiment. As would be readily understood by those skilled in the art, other inputs are also contemplated by the present invention and are generally described herein by the term sensor. In addition, an input signal may also be received from a remote transmitter 50 (FIG. 2).

The data communications bus interface 15 of the controller 11 may also preferably be connected to a plurality of output devices. The outputs may include auxiliary relay outputs 30, such as for window control, remote starting, or a remote alarm indication, as would be readily understood by those skilled in the art. A siren and/or lights 31, and green and red light emitting diodes (LEDs) 32, 33 for dashboard mounting are also illustratively connected to the controller 11. Other outputs may be directed to a valet LED 34, a dome light 36, a central lock relay or lock control unit 41, a starter kill circuit 42, and an armed relay output 43. In addition, other outputs may be directed to one or more of an audible tone generator 37, an alphanumeric display 44, a speech message annunciator 45, and a vibration transducer 46, as will be readily appreciated by those skilled in the art. Other similar indicating devices are also contemplated by the present invention, as would be readily understood by those skilled in the art. Some of the illustrated devices may be hardwired to various control nodes as would be readily understood by those skilled in the art. The control nodes may be connected by the data communications bus as would also be known to those skilled in the art.

Figure 2:
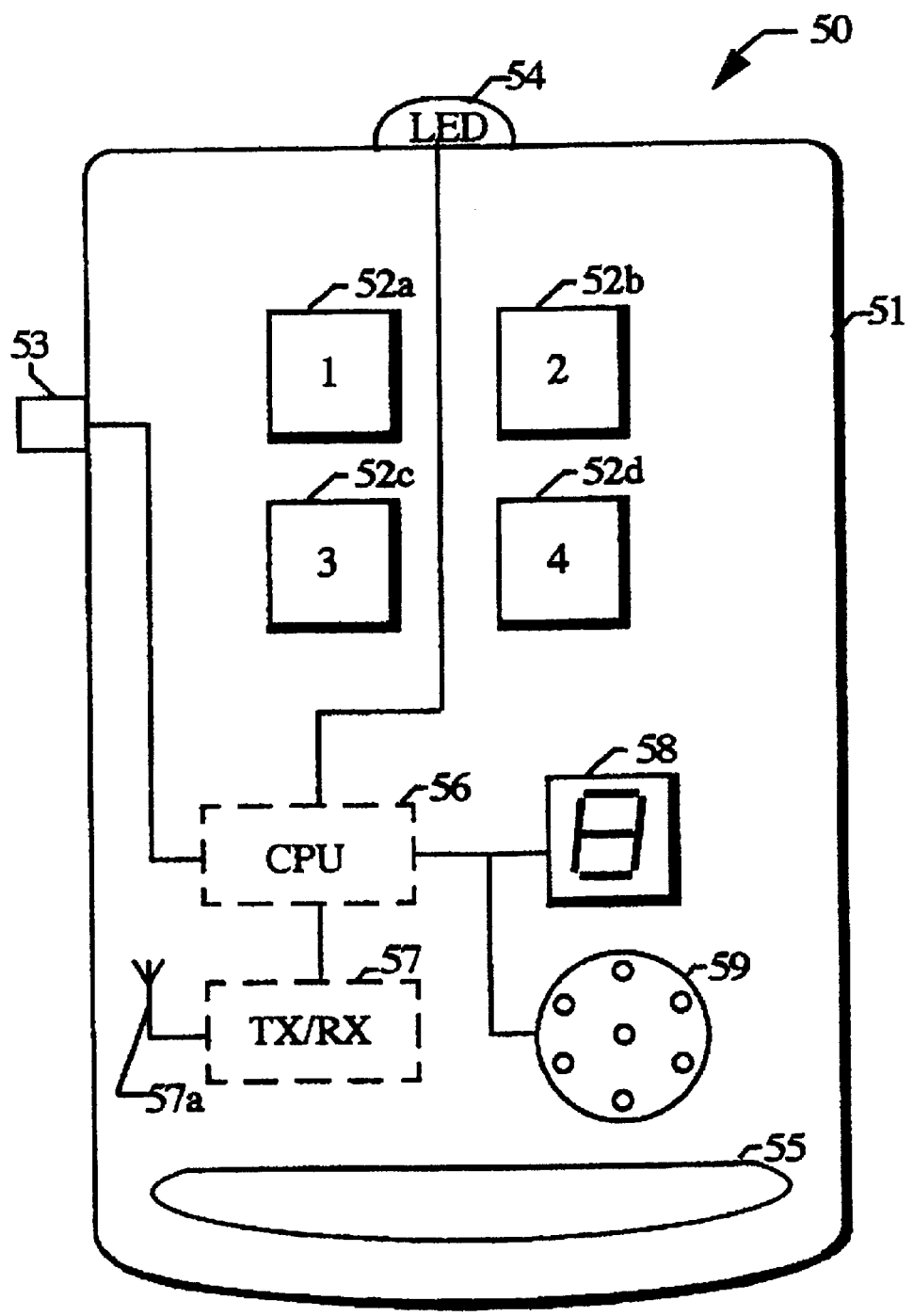
FIG. 2 is a schematic diagram of a remote transmitter of the vehicle security system in accordance with the invention.

Referring now more particularly to FIG. 2, a remote transmitter 50 in accordance with the invention is described. The remote transmitter 50 illustratively includes a housing 51 and a plurality of first momentary contact switches 52a–52d carried by the housing. A second momentary contact switch 53 and an indicating light, such as the illustrated LED 54 are also carried by or mounted on the housing 51. As would be readily understood by those skilled in the art, the remote transmitter 50 is typically relatively small and includes an opening 55 for facilitating connection to a vehicle key ring, for example. In addition, the remote transmitter 50 includes a central processing unit or microprocessor 56 operatively connected to the plurality of first switches 52a–52d, the second switch 53, and the LED 54. The microprocessor is also connected to a transmitter and/or receiver circuit 57 and its associated antenna 57a for transmitting and/or receiving signals to and from the controller 11 of the vehicle security system 10. Accordingly, the term "remote transmitter" is used broadly herein to describe the embodiment also including receiver means.

The remote transmitter 50 may also include a numeric or alphanumeric display 58, and a speaker 59 coupled to an audible tone generator or a speech message generator, as may be provided by the microprocessor 56. A vibration transducer, not shown, may also be incorporated into the remote transmitter 50 for communicating to the user as would be readily understood by those skilled in the art.

Figure 3:
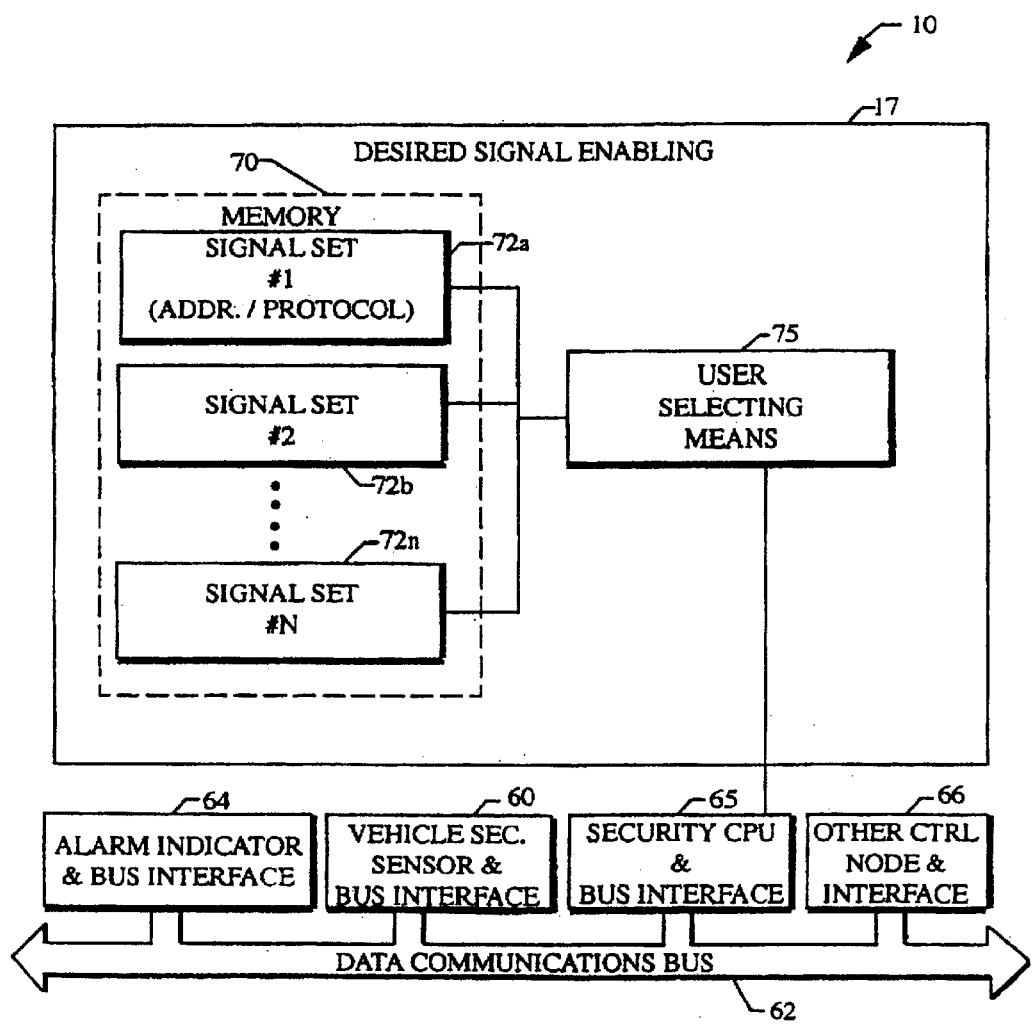
FIG. 3 is a schematic block diagram of a portion of a first embodiment of the vehicle security system in accordance with the present invention.

Turning now additionally to FIG. 3 a first embodiment of the desired signal enabling means 17 is described. The vehicle security system 10 preferably comprises a vehicle security sensor and associated sensor bus interface means 60 for interfacing the vehicle security sensor to the data communications bus 62. The vehicle security system 10 also preferably includes an alarm indicator and associated alarm indicator bus interface means 64 for interfacing the alarm indicator to the data communications bus. Examples of vehicle security sensors and alarm indicators are described above in greater detail with reference to FIG. 1.

The security system 10 further preferably comprises desired signal enabling means 17 for enabling the alarm controller 10 to operate using a desired set of signals for a desired vehicle from among a plurality of possible sets of signals for different vehicles. As would be readily understood by those skilled in the art, the term different vehicles may include vehicles from different manufacturers, different models, or even different trim levels of the same make and model. Accordingly, the desired signal enabling means 17 permits the alarm controller, that is, the security CPU and bus interface 65, to communicate with the vehicle security sensor and the alarm indicator via the data communications bus 62 so that the CPU is capable of operating the alarm indicator responsive to the vehicle security sensor.

The data communications bus 62 may preferably be a multiplexed data bus as would be readily understood by those skilled in the art. Accordingly, the sensor bus interface means, the alarm bus interface means, and the alarm controller bus interface means may each comprise multiplexing means for interfacing with the multiplexed data bus of the vehicle. For example, any of the various multiplexing schemes as disclosed in "The Thick and Thin of Car Cabling" by Thompson appearing in the IEEE Spectrum, February 1996, pp. 42–45 may be used. Other data bus connection schemes are also contemplated by the present invention.

As illustrated in FIG. 3, one embodiment of the desired signal enabling means 17 may preferably include a memory 70 for storing a plurality of sets 72a, 72b and 72n of signals for different vehicles, and selecting means for selecting the desired set of signals from the plurality of different sets of signals for different vehicles. By storing sets of signals is meant storing information or data necessary to generate the desired signals on the data bus 62 as would be readily understood by those skilled in the art. The memory 70 may include device address memory means for storing a plurality of different sets of signals representative of different device addresses for different vehicles. Alternatively, or in addition thereto, the memory means may comprise protocol memory means for storing a plurality of different protocols for different vehicles. One or more other control nodes and associated bus interfaces 66 may also be connected to the data communications bus 62 as would also be readily understood by those skilled in the art. For example, other control nodes may include an engine controller thereby permitting the alarm controller to disable the engine, or the body controller thereby permitting the alarm controller to control the vehicle door locks as would be readily understood by those skilled in the art.

In the illustrated embodiment of FIG. 3, the selecting means may comprise user selecting means 75 for permitting a user to select the desired set of signals. A keypad or other input means may be used to permit the user to select the desired signal set for his vehicle. The valet switch 27 (FIG. 1), for example, may also be operated by the user to select the desired signal set. The user may select the desired set of signals by entering a unique digital code similar to the selection of signals for a home electronics universal remote control. Other techniques for permitting the user to select the desired signal set from a plurality of stored sets are also contemplated by the invention as would be readily appreciated by those skilled in the art.

Figure 4:
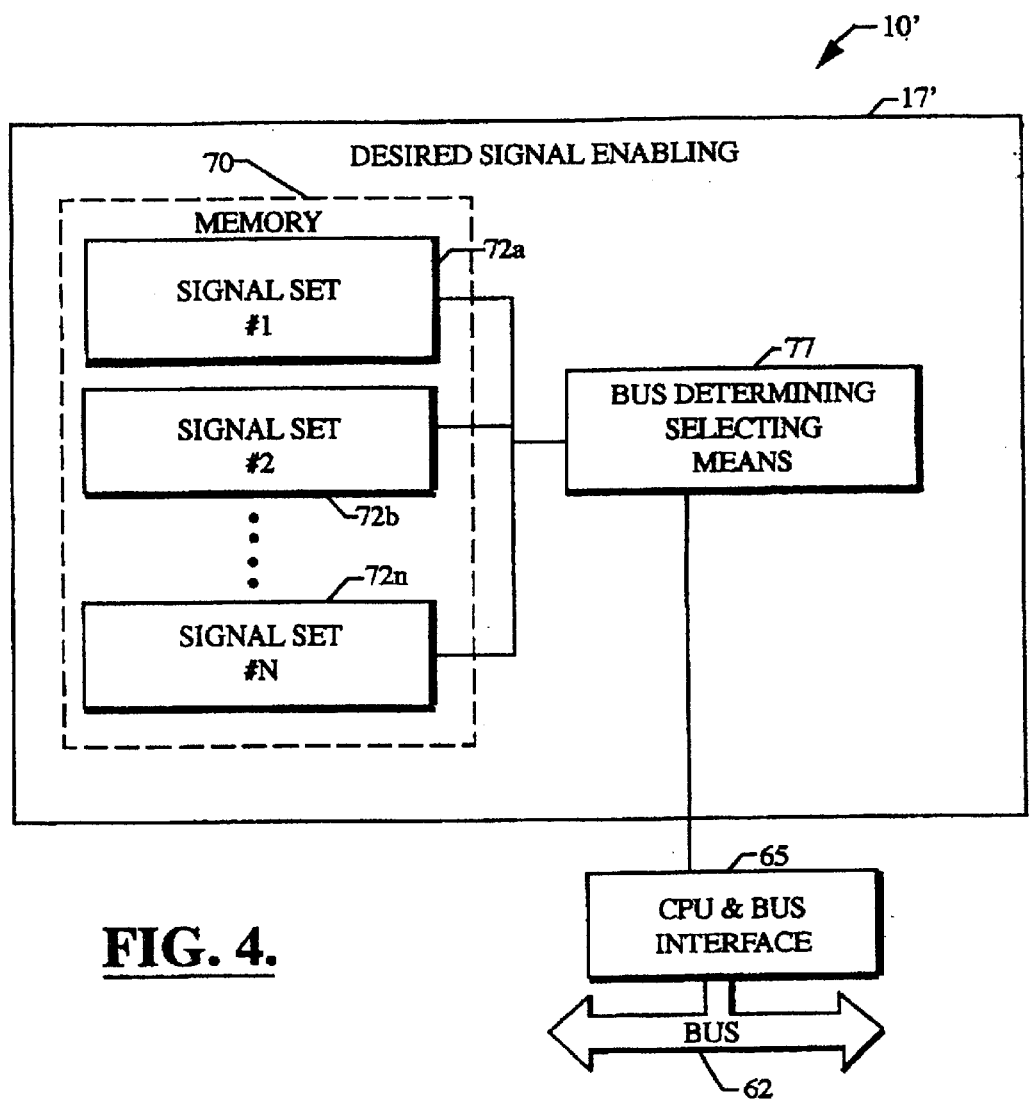
FIG. 4 is a schematic block diagram of a portion of a second embodiment of the vehicle security system in accordance with the present invention.

Referring now additionally to FIG. 4 another embodiment of the desired signal enabling means 17' is described in accordance with the security system 10' of the present invention. In this embodiment, the selecting means may comprise bus determining means 77 for determining the desired set of signals based upon signals on the data communications bus. For example, the bus determining means could determine the desired set of signals based upon sensed voltage levels or based upon the timing of signal pulses on the data communications bus 62. The other components of this embodiment of the desired signal enabling means 17' are similar to those described above with reference to FIG. 3 and need no further description.

Figure 5:
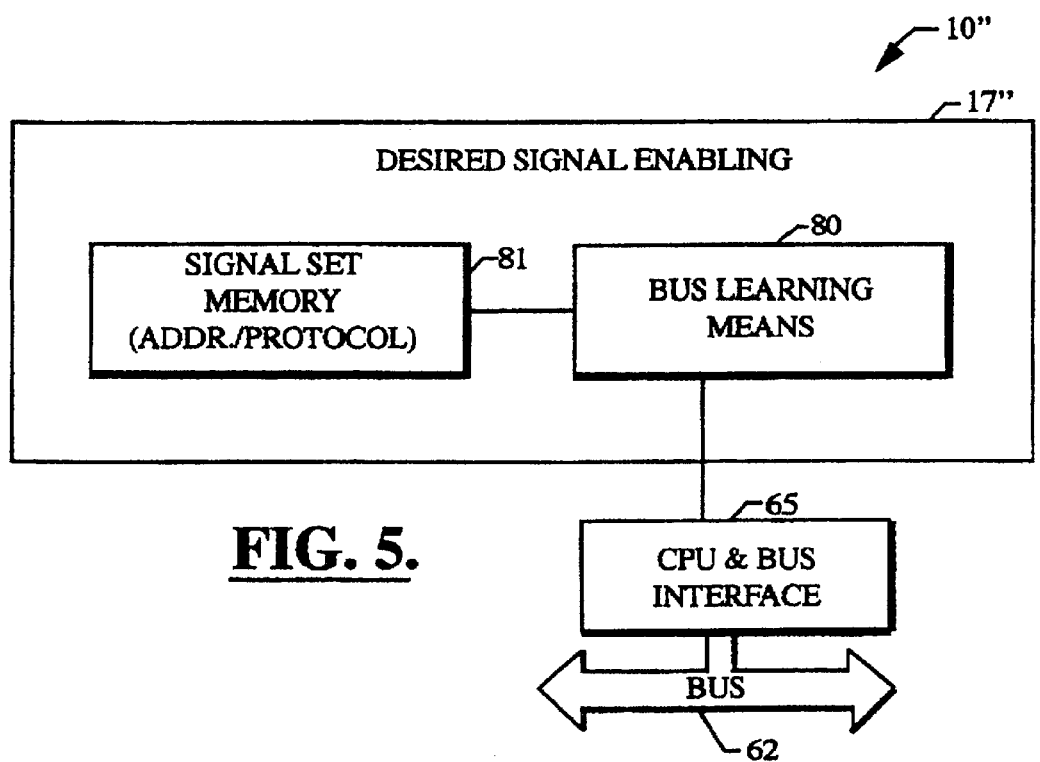
FIG. 5 is a schematic block diagram of a portion of a third embodiment of the vehicle security system in accordance with the present invention.

Yet another embodiment of the security system 10" according to the invention is explained with reference to FIG. 5. In this illustrated embodiment, the desired signal enabling means 17" includes a desired signal set memory 81 operatively connected to the illustrated bus learning means 80. The bus learning means 80 may determine and store in the signal set memory 81 the protocol and/or device addresses for the vehicle devices. For example, the bus learning means 80 may permit the user to operate various vehicle devices and store a desired signal set based thereon as would be readily understood by those skilled in the art. The other components of the desired signal enabling means 17" are similar to those described above with reference to FIG. 3 and need no further description.

Figure 6:
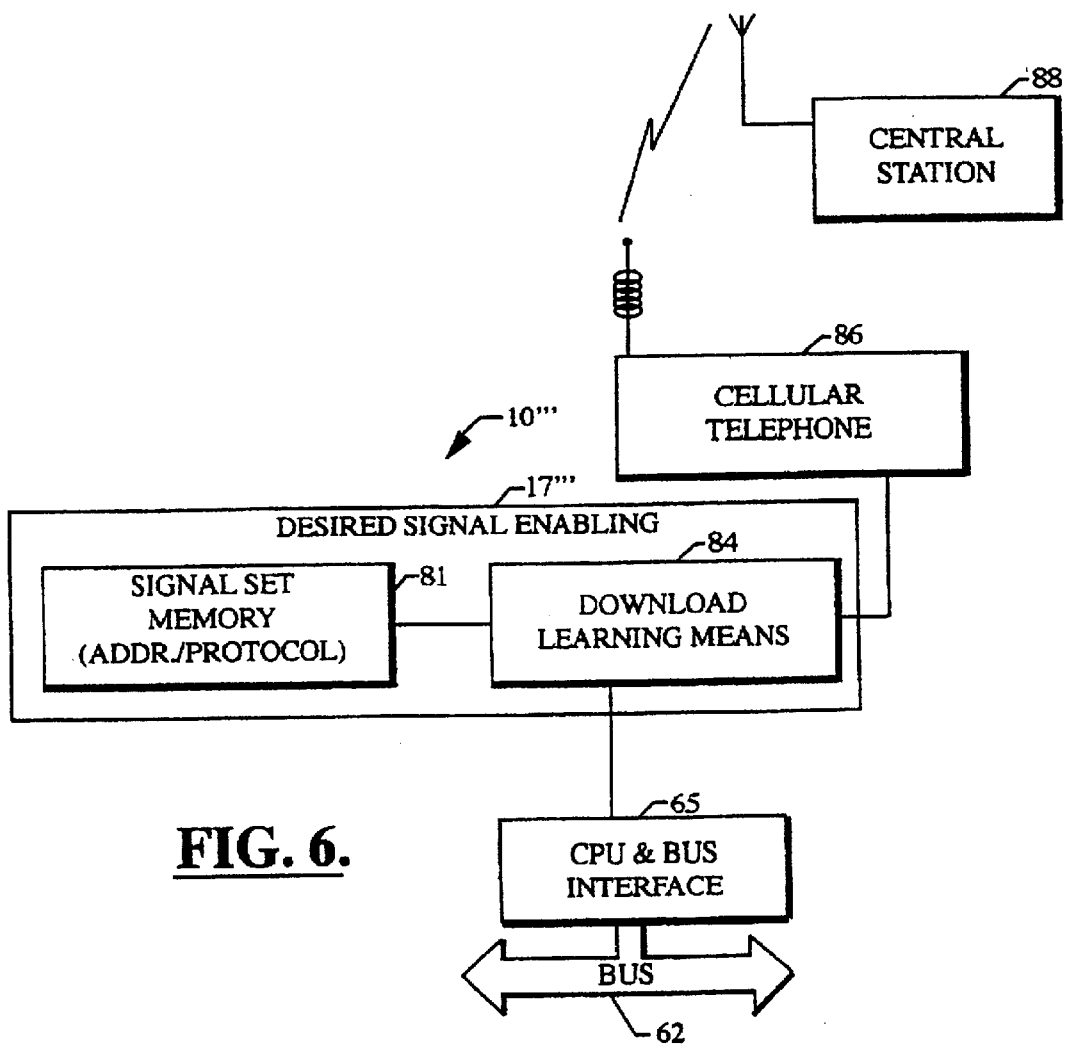
FIG. 6 is a schematic block diagram of a portion of a fourth embodiment of the vehicle security system in accordance with the present invention.

Still another embodiment of the desired signal enabling means 17''' is explained with reference to FIG. 6. The desired signal enabling means 17''' includes a signal set memory 81 operatively connected to the schematically illustrated download learning means 84. The download learning means 84 may include an interface connected to the illustrated vehicle cellular telephone 86 to permit learning or downloading of the desired signal set from a remote or central monitoring and control station 88, for example. As would be readily understood by those skilled in the art, the download learning means as well as the other desired signal enabling means may be implemented by software in the CPU 12 of the controller 11 or in a separate microprocessor or circuits.

Figure 7:
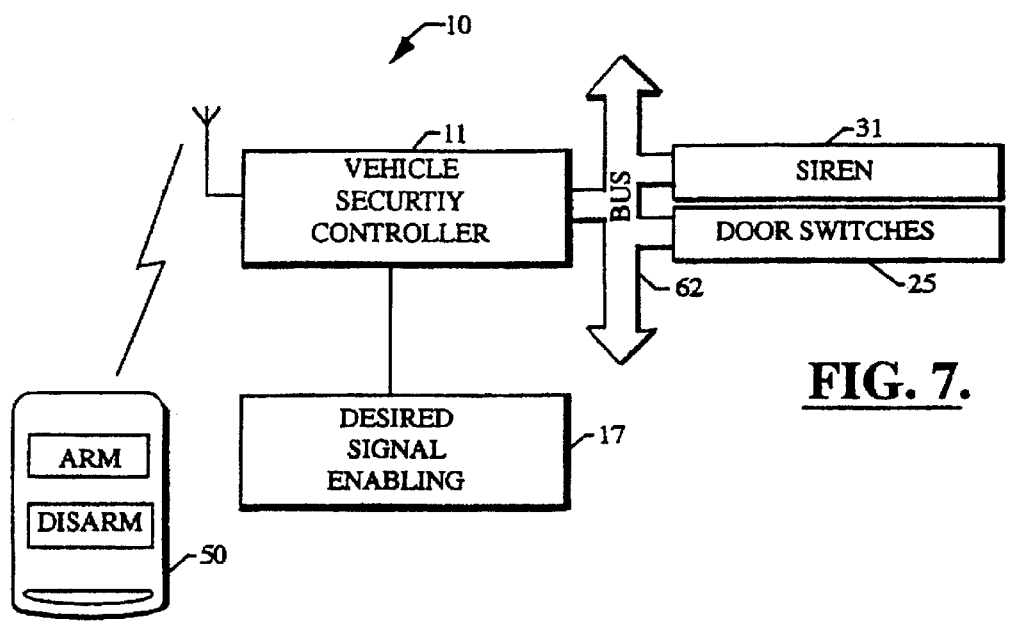
FIG. 7 is a schematic block diagram of the vehicle security system in accordance with the present invention.

One implementation of the security system 10 is shown in FIG. 7 and includes the vehicle security controller 11. The remote transmitter 50 can switch the controller 11 between the armed and disarmed modes. The controller 11 in the armed mode is capable of generating an alarm indication via the siren 31 (FIG. 1) and based upon the door switches 25 (FIG. 1), for example. The communications are via the data communications bus 62 and, are based upon the desired signal set from the desired signal enabling means 17.

Figure 8:
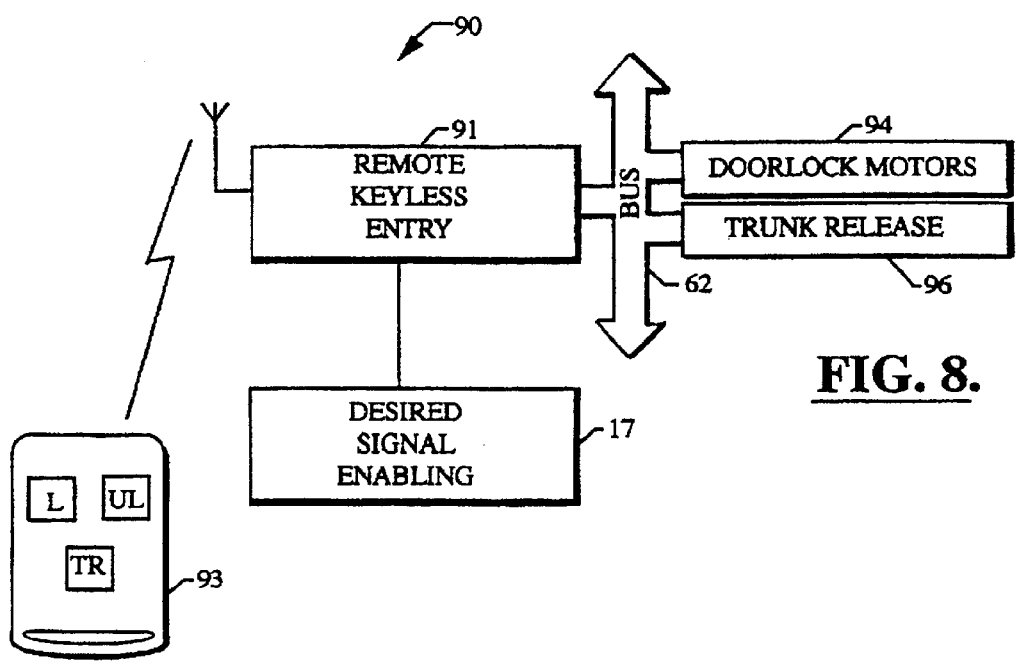
FIG. 8 is a schematic block diagram of a remote keyless entry system in accordance with the present invention.

The features and aspects described above may also be readily implemented into other vehicle related systems, such as for performing remote control functions. As shown in FIG. 8, the invention may be embodied in a remote keyless entry system 90 including a remote keyless entry controller 91 operated by a remote handheld transmitter 93. The controller 91 communicates with the door lock motors 94 and illustrated trunk release 96 via the data communications bus 62. The remote keyless entry system 90 also includes the desired signal enabling means 17 which permits the controller 91 to perform the desired door locking and trunk release remote control functions or operations as would also be readily understood by those skilled in the art. As would be readily appreciated by those skilled in the art, any of the desired signal enabling means described herein and equivalent thereto may be used for the remote keyless entry system 90 in accordance with the present invention.

Figure 9:
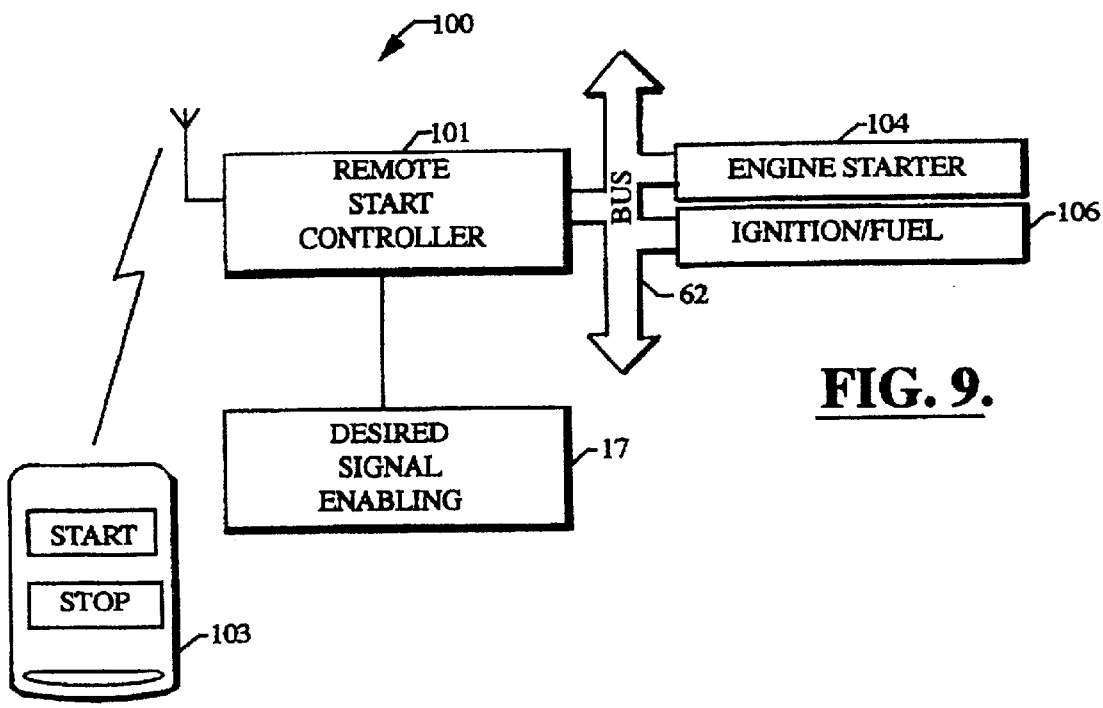
FIG. 9 is a schematic block diagram of a remote engine starting system in accordance with the present invention.

Turning now to FIG. 9, yet another vehicle associated remote control function is illustrated and now explained. The remote engine starting system 100 includes a remote start controller 101 operable by a remote transmitter 103. The remote controller 101 may communicate via the data communications bus 62 to enable the ignition and fuel systems 106 and crank the engine starter 104. Various sensors may also be monitored as would be readily understood by those skilled in the art.

A method aspect of the invention is for operating a vehicle security system 10 for a vehicle of a type including a data communications bus 62 connecting a plurality of vehicle devices. The method preferably comprises the steps of interfacing an alarm controller 11 to the data communications bus 62, and enabling the alarm controller to operate using a desired set of digital signals for a desired vehicle from a plurality of possible sets of signals for different vehicles to thereby permit the alarm controller to communicate with at least one of a vehicle security sensor 60 and an alarm indicator 64 via the data communications bus 62 (FIG. 3). Accordingly, the alarm controller is capable of operating the alarm indicator responsive to the vehicle security sensor and via the data communication bus.

Another method of the invention is for remotely controlling a vehicle function for a vehicle of a type including a data communications bus 62 connecting a plurality of vehicle devices, and a vehicle function controller and associated bus interface means for interfacing the vehicle function controller to the data communications bus. The method comprising the steps of: enabling the vehicle function controller to operate using a desired set of signals for a desired vehicle from a plurality of sets of signals for different vehicles for permitting the vehicle function controller to communicate via the data communications bus with at least one of the vehicle devices; and receiving a signal at the vehicle from a remote transmitter so that the vehicle function controller remotely controls a vehicle function responsive to the remote transmitter.

Those of skill in the art will readily recognize the benefits and advantages of the present invention for aftermarket security systems and other aftermarket systems for implementing remote control functions wherein compatibility with a potentially large number of different protocols and/or device addresses is desired. Of course, many modifications and other embodiments of the invention will come to the mind of one skilled in the art having the benefit of the teachings presented in the foregoing descriptions and the associated drawings. Accordingly, it is understood that the invention is not to be limited to the illustrated embodiments disclosed, and that the modifications and embodiments are intended to be included within the spirit and scope of the appended claims.

That which is claimed is:

1. A remote control system for a vehicle of a type including a vehicle data communications bus connecting a plurality of vehicle devices, the remote control system comprising:
    at least one remote transmitter;
    a receiver within the vehicle;
    a vehicle function controller operatively connected to said receiver; and
    a signal enabler and a vehicle function controller bus interface associated therewith to define a data bus adaptor connected to said vehicle function controller and the vehicle data communications bus for adapting said vehicle function controller to communicate with at least one of the vehicle devices based upon at least one signal for the vehicle and responsive to said at least one remote transmitter.

2. A remote control system for a vehicle according to claim 1 wherein the plurality of vehicle devices comprises a vehicle security sensor; and wherein said vehicle function controller comprises an alarm controller for generating an alarm responsive to the vehicle security sensor.

3. A remote control system for a vehicle according to claim 1 wherein the plurality of vehicle devices comprises a plurality of vehicle door locks movable between locked and unlocked positions; and wherein said vehicle function controller comprises a door lock controller for moving the vehicle door locks between locked and unlocked positions responsive to said at least one remote transmitter.

4. A remote control system for a vehicle according to claim 1 where said plurality of vehicle devices comprises a vehicle engine starter; and wherein said vehicle function controller comprises a remote start controller for operating the vehicle engine starter responsive to said at least one remote transmitter.

5. A remote control system for a vehicle according to claim 1 wherein said signal enabler comprises a memory for storing the at least one signal for the vehicle.

6. A remote control system for a vehicle according to claim 1 further comprising a second vehicle controller; and wherein said vehicle function controller is operatively connected to said second vehicle controller.

7. A remote control system for a vehicle according to claim 1 wherein the vehicle data communications bus is a multiplexed data bus; and wherein said vehicle function controller bus interface comprises a multiplex interface for interfacing with the multiplexed data bus.

8. A remote control system for a vehicle according to claim 1 wherein said at least one remote transmitter generates changing code signals.

9. A data bus adaptor to be connected to a vehicle data communication bus and a vehicle function controller in a vehicle, the vehicle function controller being responsive to at least one remote transmitter, the data bus adaptor comprising:
    a signal enabler and a vehicle function controller bus interface associated therewith to connect to the vehicle function controller and the vehicle data communications bus for adapting the vehicle function controller to communicate with at least one vehicle device based upon at least one signal for the vehicle and responsive to the at least one remote transmitter.

10. A data bus adaptor according to claim 9 wherein the at least one vehicle device comprises a vehicle security sensor; and wherein the vehicle function controller comprises an alarm controller for generating an alarm responsive to the vehicle security sensor.

11. A data bus adaptor according to claim 9 wherein the at least one vehicle device comprises a plurality of vehicle door locks movable between locked and unlocked positions; and wherein the vehicle function controller comprises a door lock controller for moving the vehicle door locks between locked and unlocked positions responsive to the at least one remote transmitter.

12. A data bus adaptor according to claim 9 wherein the at least one vehicle device comprises a vehicle engine starter; and wherein the vehicle function controller comprises a remote start controller for operating the vehicle engine starter responsive to the at least one remote transmitter.

13. A data bus adaptor according to claim 9 wherein said signal enabler comprises a memory for storing the at least one signal for the vehicle.

14. A data bus adaptor according to claim 9 wherein the vehicle data communications bus is a multiplexed data bus; and wherein said vehicle function controller bus interface comprises a multiplex interface for interfacing with the multiplexed data bus.

15. A method for adapting a vehicle function controller to communicate over a vehicle data communication bus with at least one vehicle device and responsive to at least one remote transmitter, the method comprising:
    connecting a signal enabler and a vehicle function controller bus interface associated therewith to the vehicle function controller and the vehicle data communications bus for adapting said vehicle function controller to communicate with at least one of the vehicle devices based upon at least one signal for the vehicle and responsive to the at least one remote transmitter.

16. A method according to claim 15 wherein the at least one vehicle device comprises a vehicle security sensor; and wherein the vehicle function controller comprises an alarm controller for generating an alarm responsive to the vehicle security sensor.

17. A method according to claim 15 wherein the at least one vehicle device comprises a plurality of vehicle door locks movable between locked and unlocked positions; and wherein the vehicle function controller comprises a door lock controller for moving the vehicle door locks between locked and unlocked positions responsive to said at least one remote transmitter. door locks between locked and unlocked positions responsive to said at least one remote transmitter.

18. A method according to claim 15 where the at least one vehicle device comprises a vehicle engine starter; and wherein the vehicle function controller comprises a remote start controller for operating the vehicle engine starter responsive to the at least one remote transmitter.

19. A method according to claim 15 wherein the signal enabler comprises a memory for storing the at least one signal for the vehicle.

* * * * *